United States Patent
Chetlur et al.

(10) Patent No.: US 9,386,119 B2
(45) Date of Patent: Jul. 5, 2016

(54) MOBILE WEB ADAPTATION TECHNIQUES

(71) Applicant: International Business Machines Corporation, Armonk, NY (US)

(72) Inventors: Malolan Chetlur, Bangalore (IN); Vikas Agarwal, Bangalore (IN); Pradipta De, Incheon (IN); Sumit Mittal, Bangalore (IN); Kuntal Dey, Bangalore (IN); Sougata Mukherjea, Bangalore (IN); Ayush Dubey, Ithaca, NY (US)

(73) Assignee: International Business Machines Corporation, Armonk, NY (US)

( * ) Notice: Subject to any disclaimer, the term of this patent is extended or adjusted under 35 U.S.C. 154(b) by 343 days.

(21) Appl. No.: 13/954,193

(22) Filed: Jul. 30, 2013

(65) Prior Publication Data

US 2015/0039686 A1 Feb. 5, 2015

(51) Int. Cl.
 *H04L 29/08* (2006.01)
 *H04W 4/18* (2009.01)
(52) U.S. Cl.
 CPC ............... *H04L 67/306* (2013.01); *H04W 4/18* (2013.01); *H04L 67/02* (2013.01)
(58) Field of Classification Search
 CPC ........ H04L 67/02; H04L 67/306; H04W 4/18
 See application file for complete search history.

(56) References Cited

U.S. PATENT DOCUMENTS

| | | | |
|---|---|---|---|
| 6,970,602 B1 | 11/2005 | Smith et al. | |
| 7,318,104 B1 | 1/2008 | Lee et al. | |
| 8,615,596 B1* | 12/2013 | Upadhyay | G06F 17/30 455/414.4 |
| 2003/0237053 A1 | 12/2003 | Chen et al. | |
| 2009/0198567 A1 | 8/2009 | Dunnahoo et al. | |
| 2009/0276716 A1 | 11/2009 | Chua | |
| 2010/0318426 A1* | 12/2010 | Grant | G06F 17/30864 705/14.66 |
| 2011/0066977 A1 | 3/2011 | DeLuca et al. | |
| 2011/0153602 A1 | 6/2011 | Kiddle et al. | |
| 2011/0209201 A1* | 8/2011 | Chollat | G06F 17/30241 726/4 |

(Continued)

FOREIGN PATENT DOCUMENTS

| | | |
|---|---|---|
| CN | 101930475 A | 12/2010 |
| EP | 1538840 A2 | 6/2005 |

(Continued)

OTHER PUBLICATIONS

U.S. Appl. No. 13/873,446, filed Apr. 30, 2013, titled, Intelligent Adaptation of Mobile Applications based on Constraints and Contexts.

(Continued)

*Primary Examiner* — Joe Chacko
(74) *Attorney, Agent, or Firm* — Ryan, Mason&Lewis, LLP

(57) ABSTRACT

Techniques, systems, and articles of manufacture for mobile web adaptation techniques. A method includes determining a user preference value for each of multiple items of web content to be loaded onto a mobile device of the user; determining a content provider preference value for each of the multiple items of web content to be loaded onto at least the mobile device of the user; for each of the multiple items of web content to be loaded onto the mobile device of the user, combining (i) the corresponding user preference and (ii) the corresponding content provider preference value, thereby generating a combined value; and loading the multiple items of web content to the mobile device of the user in order of highest combined value to lowest combined value.

20 Claims, 7 Drawing Sheets

(56) References Cited

U.S. PATENT DOCUMENTS

| | | | |
|---|---|---|---|
| 2011/0231778 A1 | 9/2011 | Hoag et al. | |
| 2012/0209914 A1 | 8/2012 | Sample et al. | |
| 2012/0284615 A1* | 11/2012 | Zuckerberg | G06Q 30/02 715/234 |
| 2012/0289147 A1* | 11/2012 | Raleigh | H04L 67/2847 455/3.06 |
| 2013/0132854 A1* | 5/2013 | Raleigh | G06F 3/0482 715/738 |
| 2013/0238762 A1* | 9/2013 | Raleigh et al. | H04L 67/306 709/219 |
| 2013/0238777 A1* | 9/2013 | Raleigh | H04L 67/1097 709/223 |

FOREIGN PATENT DOCUMENTS

| | | |
|---|---|---|
| WO | 03032146 A1 | 4/2003 |
| WO | 2008103639 A1 | 8/2008 |
| WO | 2010094927 A1 | 8/2010 |
| WO | 2011047335 A1 | 4/2011 |

OTHER PUBLICATIONS

Akamai Q3 2012 report summary, http://www.akamai.com/dl/akamai_soti_q312_exec_summary.pdf.

Butkiewicz et al. Understanding Website Complexity: Measurements, Metrics, and Implications in IMC, 2011.

Charzinski, Traffic Properties, Client Side Cachability and CDN Usage of Popular Web Sites, in MMB & DFT, 2010.

Chava et al. Cost-Aware Mobile Web Browsing, IEEE Pervasive Computing, 99, 2012.

Malandrino et al. Mimosa: Context-Aware Adaptation for Ubiquitous Web Access, Personal and Ubiquitous Computing, 14(4):301-320, 2010.

Mohomed et al. Urica: Usage-Aware Interactive Content Adaptation for Mobile Devices, in EuroSys, 2006.

Thiagarajan et al. Who Killed my Battery? Analyzing Mobile Browser Energy Comsumption, in WWW, 2012.

Wang et al. How Far Can Client-Only Solutions go for Mobile Browser Speed? In WWW, 2012.

Dubey et al. Co-Operative Content Adapatation Framework, WWW 2013 Companion, May 13-17, 2013, Rio de Janeiro, Brazil. ACM 978-1-4503-2038-2/13/05.

Mohomed et al. Correlation-Based Content Adaptation for Mobile Web Browsing, Middleware '07 Proceedings of teh ACM/IFIP/USENIX 2007 International Conference on Middleware, pp. 101-120.

Hong et al. Fast and Adapative Browsing State Recovery for Multimedia Consumer Electronics Devices, 2011 IEEE International Conference on Consumer Electronics (ICCE).

Evans, Adaptive Multimedia Access: From User Needs to Semantic Personalization, Circuit and Systems, 2006.

Harumoto et al. Effective Web Browsing Through Content Delivery Adaptation, ACM Transactions on Internet Technology, vol. 5, No. 4, Nov. 2005, pp. 571-600.

Wikipedia, Adaptive Bit Rate Streaming, Jul. 28, 2013, http://en.wikipedia.org/w/index/php?title=Adaptive_bitrate_streaming&oldid=566197927.

Adobe, HTTP Dynamic Streaming on the Adobe Flash Platform, 2010.

Wikipedia, HTTP Live Streaming, Jul. 22, 2013, http://en.wikipedia.org/w/index.php?title=HTTP_Live_Streaming&oldid=565325659.

Microsoft, Smooth Streaming, accessed Jul. 30, 2013, http://www.microsoft.com/silverlight/smoothstreaming/.

* cited by examiner

202

1: $R = \{r_{ij}\}$ ← item-resource usage matrix
2: for $i = 1 \to n$ do
3:     $R_i$ ← resource limit for $i^{th}$ resource
4: end for
5: $U$ ← user context, $D$ ← developer preferences
6: $Z \leftarrow f(D,U) = D.*U$
7: $Z_{sort}$ ← sortAndBreakTies($Z$)

8: for $k = 1 \to m$ do
9:     $i$ ← indexOf($Z_{sort}[k]$)
10:     for $j = 1 \to n$ do
11:         if $r_{ij} > R_j$ then
12:             continue
13:         end if
14:     end for
15:     $X_i$ ← true {$X$ is the decision vector}
16:     for $j = 1 \to n$ do
17:         $R_j \leftarrow R_j - r_{ij}$
18:     end for
19: end for
20: $Y$ = orderedItemList($X$, $Z_{sort}$, $R$)

21: Output: Y

FIG. 2

MOBILE WEB ADAPTATION TECHNIQUES

FIELD OF THE INVENTION

Embodiments of the invention generally relate to information technology, and, more particularly, to mobile web and mobile content technology.

BACKGROUND

Mobile web technology includes features of near-ubiquitous access to content and limited resources such as bandwidth and battery. Because most web pages are designed for the wired Internet, challenges exist in adapting many web pages seamlessly to ensure a satisfactory mobile web experience. For example, content-heavy web pages commonly lead to longer load times on mobile browsers. Additionally, a pre-defined load order of items in a web page does not adapt to mobile browsing habits, where a user may look for different portions of a web page to load under different contexts.

Accordingly, a need exists for improved mobile web content adaptation techniques.

SUMMARY

In one aspect of the present invention, mobile web adaptation techniques are provided. An exemplary computer-implemented method can include steps of determining a user preference value for each of multiple items of web content to be loaded onto a mobile device of the user, determining a content provider preference value for each of the multiple items of web content to be loaded onto at least the mobile device of the user, for each of the multiple items of web content to be loaded onto the mobile device of the user, combining (i) the corresponding user preference and (ii) the corresponding content provider preference value, thereby generating a combined value for each of the multiple items of web content, and loading the multiple items of web content to the mobile device of the user in order of highest combined value to lowest combined value.

In another aspect of the invention, an exemplary computer-implemented method can include determining a user preference value for each of multiple items of web content to be loaded onto a mobile device of the user based on (i) information pertaining to the multiple items of web content provided by a content provider, (ii) one or more user policies, (iii) one or more context-dependent user requirements, and (iv) one or more constraints pertaining to the mobile device, ordering content transformation of the multiple items of web content to be loaded onto the mobile device of the user based on (i) the determined user preference values for the multiple items of web content and (ii) the information pertaining to the multiple items of web content provided by the content provider, and transforming the multiple items of web content to be loaded onto the mobile device of the user based on said ordering.

Another aspect of the invention or elements thereof can be implemented in the form of an article of manufacture tangibly embodying computer readable instructions which, when implemented, cause a computer to carry out a plurality of method steps, as described herein. Furthermore, another aspect of the invention or elements thereof can be implemented in the form of an apparatus including a memory and at least one processor that is coupled to the memory and configured to perform noted method steps. Yet further, another aspect of the invention or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

BRIEF DESCRIPTION OF THE DRAWINGS

FIG. 2 is a diagram illustrating an algorithm, in accordance with at least one embodiment of the invention;

DETAILED DESCRIPTION

Figure 1:
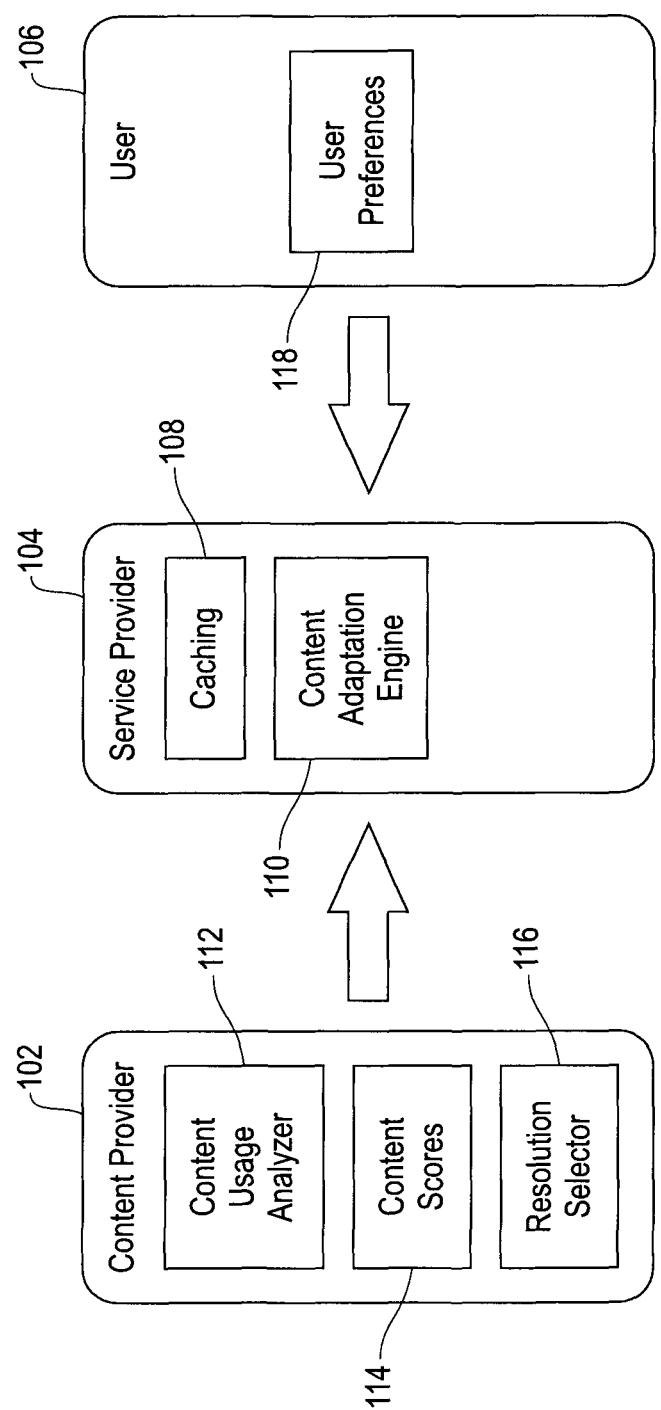
FIG. 1 is a diagram illustrating system components, in accordance with at least one embodiment of the invention.

As described herein, an aspect of the present invention includes techniques for client-only adaptive browsing as well as cooperative content adaptation. User experience in a mobile web context can be affected by various factors such as, for example, device diversity, network bandwidth and resource limitations. Additionally, growing complexity of web pages adversely affects page load time in a mobile browser. When a mobile user is interested in a snippet or portion of a given web page (also referred to herein as one or more items of web content), waiting for the entire page to load can lead to user frustration. Cooperative content adaptation techniques, such as detailed herein, take into account user preferences for content types along with importance scores or values assigned by a content creator, to generate an order to load items of web content in a mobile web page. As such, under resource constraints (such as limited download capacity), more relevant or preferred items can be loaded prior to other items.

At least one embodiment of the invention includes combining one or more user preferences and one or more publisher (or provider or developer) preferences using a single function to maximize the value of such a function under multiple resource constraints. For example, at least one embodiment of the invention includes implementing a heuristic that assigns a weight (specifically, a higher weight than is assigned to other items or variables) to items from the user and the publisher, while satisfying a constraint problem.

As such, the techniques detailed herein can include implementation of a framework wherein a content creator is additionally included in guiding the adaptation, such as via allowing the content creator to specify importance of one or more items in a web page. Additionally, as noted above, at least one embodiment of the invention includes incorporating the content creator as well as the user in the web content adaptation process.

In such a cooperative content adaptation, the content creator can identify and/or tag the importance of each of one or more items of web content in a web page (which can include, for example, the entire web page) during creation. For instance, in a news page, the content creator can tag the most important or relevant news item. Also, the user can express his or her preference for different items or content blocks, such as one or more images, video clips, audio clips and/or advertisements, under different contexts. For example, while walking, a user may prefer audio content over video.

Further, before servicing a web page request, at least one embodiment of the invention includes computing a combined score for each item in a web page and/or each item of web content based on the value assigned to the item by content creator and the preference for the item set by the user (which can be context-dependent). Subsequently, items are loaded onto the client device (for example, a web browser, mobile application, etc.) based on the combined score, in an order of highest combined score to lowest combined score, until a given resource is consumed. Such resources can include a resource that is limited and/or environmental such as network bandwidth, battery availability, computing resource on the device, etc.

A web page includes different classes of content, such as, for example, text content, image content, audio content, video content, advertisements, etc. As detailed herein, at least one embodiment of the invention enables a user to specify the order of importance (for example, via assignment of a score or value) among various items (such as from one or more of the content classes noted above) in different contexts. Additionally, the content creator can also assign an importance score or value to each of one or more items, thereby creating a ranking of multiple items. Further, at least one embodiment of the invention can include introducing additional attributes to the score assignment framework. The additional attributes can be used to specify the importance of the item, object and/or content by the developer or publisher. For example, new attributes can be added in HTML5 (the fifth revision of the hypertext markup language standard) to indicate the importance of the item being included. For instance, a HTML5 tag specifying the score by the publisher or developer can be used to specify the importance of the item that can be exploited during the computation of the combined score.

Given user and developer preferences for each of multiple items, in addition to the resource budget of the device, a content selection problem can be formulated as follows. Let there be m items in a web page including images, videos, audios, advertisements, etc. Let there be n resources for which the maximum usage budget is specified as $R_j$, where $j \in \{1, 2, \ldots, n\}$. Additionally, let X be the Boolean vector which denotes a specific selection of items. Accordingly, at least one embodiment of the invention includes determining the selection X which maximizes a utility function, F, as: arg max F(X), $x_i \in \{0, 1\}$, such that $$\forall j \in \{1, 2, \ldots, n\} \sum_{i=1}^{m} x_i r_{ij} \le R_j.$$

As described herein, at least one embodiment of the invention includes maximizing a measure of combined user and developer satisfaction based on scores assigned by the user and developer for individual items. Therefore, the utility function, F, can embody the sum of the combined scores of the user and developer, represented as $$F(X) = \sum_{i=1}^{m} x_i z_i,$$

where $z_i$ represents a composite score (a single value) per item by combining the user score and the developer score for that item.

Additionally, consider a vector, Z, of size m, that contains the $z_i$ values. In at least one embodiment of the invention, Z is computed as Z=ƒ(D, U), where D and U are vectors of size m representing developer and user scores for each item, respectively. At least one embodiment of the invention can also include applying the scalar product operator on the D and U vectors: Z=ƒ(D, U)=D. U.

In an example embodiment of the invention, implementation of the above-noted example framework assumes an intermediate proxy, hosted by a service provider, which executes the optimization algorithm for item selection and delivery. This may require user preferences to be exposed to the service provider. Alternatively, in one or more embodiments of the invention, a privacy preserving design, similar to a client-only browser, can be implemented wherein the selection of items is carried out on the user mobile device. Accordingly, instead of fetching each item, the mobile device can receive a summary file that provides the size of each item on the web page. With the sizes as input, the optimization algorithm executes on the mobile device.

FIG. 1 is a diagram illustrating system components, in accordance with at least one embodiment of the invention. By way of illustration, FIG. 1 depicts a content provider 102, a service provider 104, and a user 106. Additionally, the service provider 104 includes a content adaptation engine 110, which selects and orders components in a webpage and/or an application (app), and a caching component 108, which caches meta-data pertaining to pages and/or applications to be used by the content adaptation engine 110.

The content provider 102 includes a content usage analyzer component 112, which collects user feedback action such as clicks and other feedback from a user. The content usage analyzer component 112 can aid a content developer in making a more informed decision while scoring the contents in a page and/or app. Also, the content provider 102 includes a resolution selector component 116, which maintains different pre-defined collections of components from which a user can select. Further, the content provider 102 can also include a content scores component 114, which marks a score to each component of the content. Scores for individual items are calculated by combing the scores of the user and the content provider. This can be further determined to maximize the utility of F(X), with z(i) values for individual items and, for instance, can be a scalar product of the user score and the content provider score (Z=D.U). As detailed herein, this score is sent to the content adaptation engine 110 when requested.

As also depicted in FIG. 1, user component 106 includes a user preferences component 118, which provides the user's choice of type of content. Collecting user preference for content can include multiple techniques. For example, a user can provide preferences at a content-type level. This might include, for instance, an ordering among image, audio, video, and/or advertisement content type. Also, a user can pre-define type-level preferences for different contexts. For example, while in a shopping mall, the user may prefer advertisements, whereas while in low bandwidth conditions, the user prefers that video input is the last thing to display.

Further, user preferences can be specified over a data plan. For example, at different usage levels, the service provider can trigger different preferences for the user (for instance, pre-defined preferences). By way of illustration, roaming versus non-roaming states can have or be associated with different user preferences.

As also noted, at least one embodiment of the invention also includes collecting developer preferences. By way of example, this can include a developer rating of each item in a page and/or application. For instance, a developer may indicate that for a news site, the central image is the most important aspect, while on a multimedia site, video is the most important aspect. Inclusion of developer preferences can allow developers to protect monetary incentives.

Accordingly, at least one embodiment of the invention includes combining user preferences and developer/publisher preferences using a single function or scoring system so as to maximize the value of this function or scoring system under multiple resource constraints. An example embodiment of the invention can additionally include tuning the function or scoring system to increase (or decrease) the importance or influence of either the user or the developer/publisher. Further, at least one embodiment of the invention includes deriving the single function or scoring system from a heat map. A heat map of a page can include the typical parts of the web page or the content that is likely to receive more attention from the user. Also, a heat map can also be deduced from the hits generated from users who have previously accessed the web page and which portions of the page have received clicks and input from a user.

Moreover, while one or more example embodiments of the invention are described herein within a mobile browsing context, the techniques detailed herein can include implementation suitable in any resource-constrained environment.

User scoring can include, for example, a user expressing his or her preference by tagging content types. Similarly, content developer scoring can include the developer tagging each item or item block with a score. For instance, for a web page, individual items can be tagged with a score, while for web applications, widgets can be clustered into blocks of similar type and tagged with a score. Accordingly, as noted, at least one embodiment of the invention includes composing a score for cooperative adaptation via combination of the user score(s) and the developer score(s). A function implemented to compose this score can include one or more properties such as, for example, assigning higher scores to items rated highly by both the user and the developer.

Further, in at least one embodiment of the invention, selection of items can be based on composite scores, and the ordering of items for sending to an end device can be based on attributes of the items such as size of the item, composite score value, etc.

FIG. 2 is a diagram illustrating an algorithm 202, in accordance with at least one embodiment of the invention. As depicted in FIG. 2 and detailed herein, given the scores of components by the user and developer, the scores are combined using a function that maximizes the total value (indicated by the score) of loading the individually selected items. The components are sorted based on the composite score, and items are selected based on the highest composite score until no resources are remaining. Moreover, the order of selection provides the order of dispatch to the user device.

Also, at least one embodiment of the invention includes content adaptation exclusively by a client at an end-point or end-device. Such an embodiment includes utilizing a manifest file pertaining to the content accessed. As used herein, a manifest file is a file describing corresponding content as well as one or more elements thereof. Accordingly, a client can manipulate content adaptation using a manifest file based on one or more user policies, context, one or more constraints, one or more preferences (locally available), as well as based on content provider information shared using the manifest file. Content provider information can include information such as bit-rate of the content, checksum, provenance, compute requirements for varying (for instance, best, medium and low quality) experience. A content provider can also add any other information pertaining to the content that the local client can make use of in improving the experience or reducing resource requirements. As such, in an embodiment such as detailed above, the content can subsequently be filtered, re-ordered, and ultimately transformed upon support from the content provider.

Figure 3:
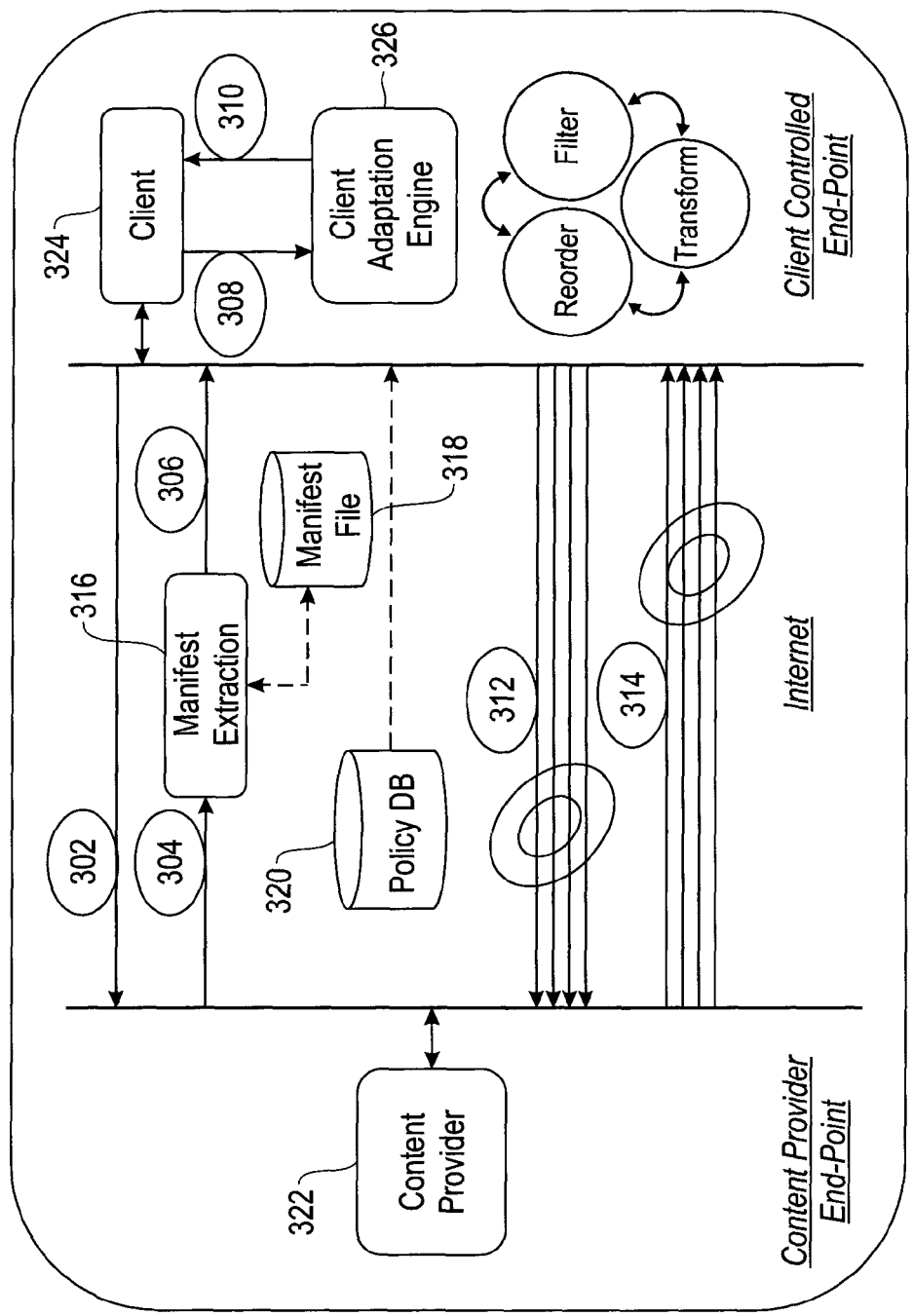
FIG. 3 is a diagram illustrating system components, in accordance with at least one embodiment of the invention.

FIG. 3 is a diagram illustrating system components, in accordance with at least one embodiment of the invention. By way of illustration, FIG. 3 depicts components including a content provider component 322, a policy database (DB) 320, a manifest extraction component 316, a manifest file database 318, a client component 324 and a client adaptation engine 326. Additionally, FIG. 3 also depicts various steps carried out by and among the above-noted components in furtherance of client-only adaptive browsing in accordance with an example embodiment of the invention.

For example, step 302 includes receiving a request from the client controlled end-point. Step 304 includes receiving a request from the content provider end-point to send a manifest file, and step 306 includes responding to this request with obtaining a manifest file via the manifest extraction component 316 and manifest file database 318, and sending the manifest file to the client controlled end-point. In at least one embodiment of the invention, other than two end-points, a manifest extraction component and a manifest database can be located anywhere either on the client side, the server side, or in the intermediary proxy.

Step 308 includes requesting a browsing plan from the client component 324, as well as inputting the manifest file and one or more policy details (server, client, etc.) to the client adaptation engine 326. Additionally, step 310 includes responding to this request with a browsing plan which has been filtered, reordered and transformed. As used herein, for example, "filtered" refers to an item being dropped or precluded from being loaded or rendered on the client device, "reordered" refers to an the item being one of multiple earlier items that is loaded again loaded later in the presently noted order, and "transformed" refers to, by way of example, a video with a lower bit-rate being chosen or derived from a high resolution and/or higher bit-rate video.

Step 312 includes obtaining web requests as per the browsing plan, and step 314 includes receiving responses for adaptive requests. Adaptive requests include multiple individual requests from the client incorporating the filtering, re-ordering and transformation steps accounted for in the form of requests.

Figure 4:
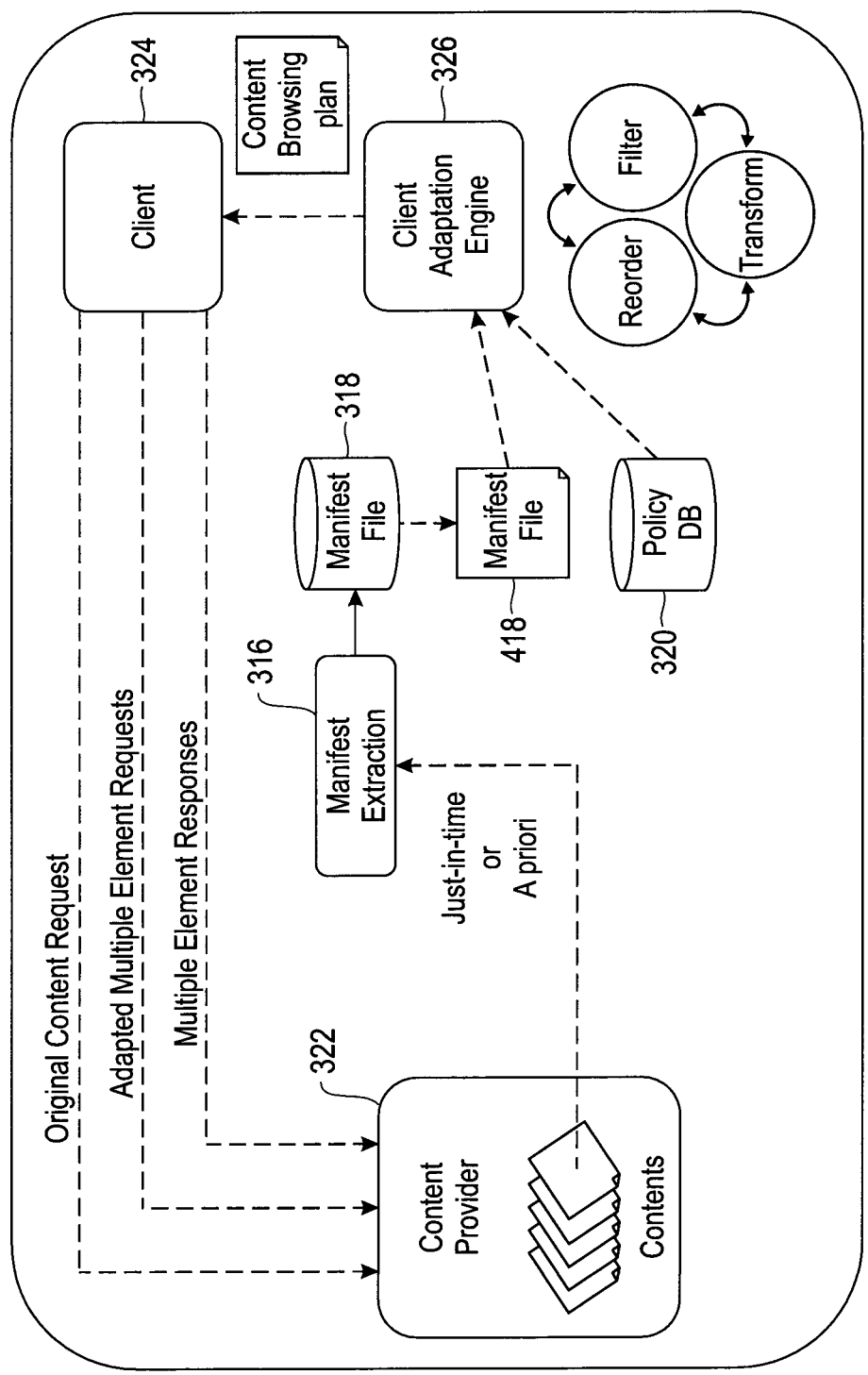
FIG. 4 is a diagram illustrating system components, in accordance with at least one embodiment of the invention.

FIG. 4 is a diagram illustrating system components, in accordance with at least one embodiment of the invention. Similar to FIG. 3, FIG. 4 depicts content provider component 322, policy database (DB) 320, manifest extraction component 316 and manifest file database 318 from which a manifest file 418 is obtained. Additionally, FIG. 4 also depicts client adaptation engine 326, which provides a content browsing plan to client component 324.

Further, as shown in FIG. 4, original content requests and adapted element requests are provided by the client component 324 to the content provider component 322. Contents are provided from the content provider component 322 to the manifest extraction component 316 (for example, in a just-in-time manner or a priori). As used herein, for example, "just-in-time" can refer to manifest file pertaining to a web page or web content being created upon a request from a client. Also, a manifest file can also be created a priori and stored in manifest file database. Further, in at least one embodiment of the invention, a combination of both approaches may also be used to manage both the static and dynamic items of a web page or web content.

Additionally, the manifest extraction component 316 accesses the manifest file database 318 to obtain and/or derive manifest file 418, which is provided (along with input from the policy DB 320) to the client adaptation engine 326.

Techniques such as depicted in FIG. 3 and FIG. 4 include enabling content adaptation without revealing client context and preference information. Additionally, such techniques can be implemented in various environments including, for example, in dynamic and unpredictable environments (such as with mobile devices) with adaptation at the target endpoint.

Figure 5:
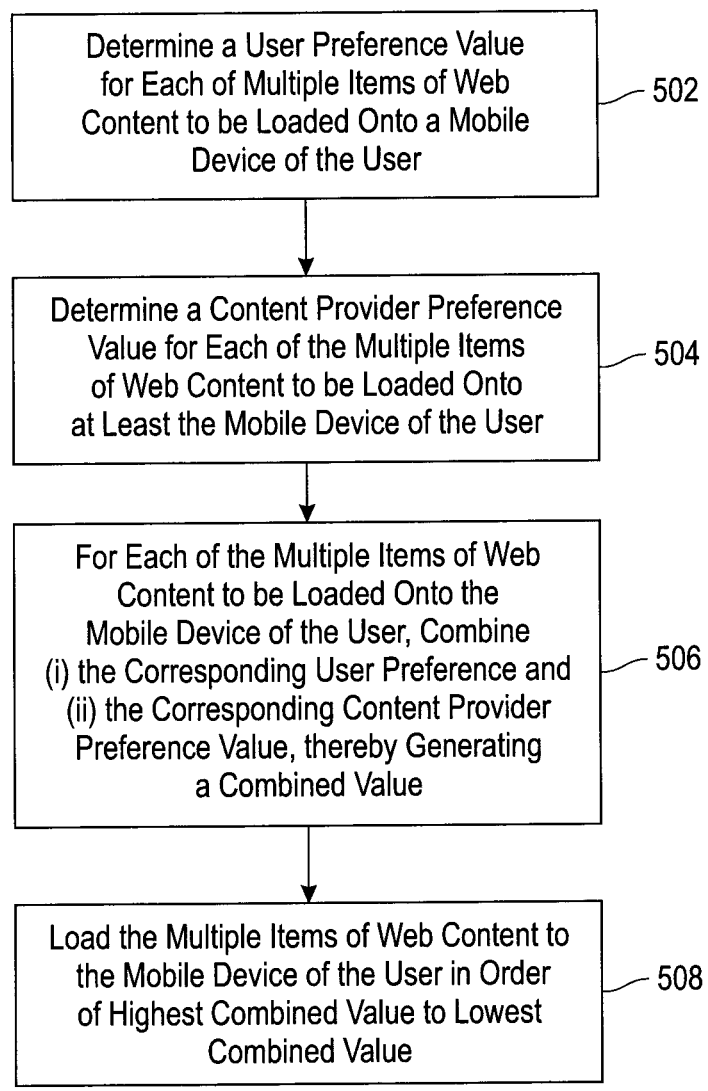
FIG. 5 is a flow diagram illustrating techniques according to an embodiment of the invention.

FIG. 5 is a flow diagram illustrating techniques according to an embodiment of the present invention. Step 502 includes determining a user preference value for each of multiple items of web content to be loaded onto a mobile device of the user. Determining a user preference value can include, for example, collecting a user preference at a content-type level.

Step 504 includes determining a content provider preference value for each of the multiple items of web content to be loaded onto at least the mobile device of the user. Determining a content provider preference value can include, for example, determining developer intent in content adaptation.

Step 506 includes, for each of the multiple items of web content to be loaded onto the mobile device of the user, combining (i) the corresponding user preference and (ii) the corresponding content provider preference value, thereby generating a combined value for each of the multiple items of web content. Combining the user preference value and the content provider preference value can include executing a heuristic that weights the content provider preference value more highly than its corresponding user preference value, executing a heuristic that weights the user preference value more highly than its corresponding content provider preference value, and/or executing a heuristic that weights the user preference value and its corresponding content provider preference value equally.

Step 508 includes loading the multiple items of web content to the mobile device of the user in order of highest combined value to lowest combined value. Loading can include, for example, loading the multiple items of web content to the mobile device of the user in order of highest to lowest combined value under multiple resource constraints. Additionally, in at least one embodiment of the invention, loading can include loading the multiple items of web content as-is and/or loading the multiple items of web content, wherein each of the multiple items of web content comprises a transformed version of the web content.

The techniques depicted in FIG. 5 can also include filtering an item of web content if the item does not satisfy one or more resource constraints. Additionally, at least one embodiment of the invention can include transforming an item of web content to satisfy one or more resource constraints.

Figure 6:
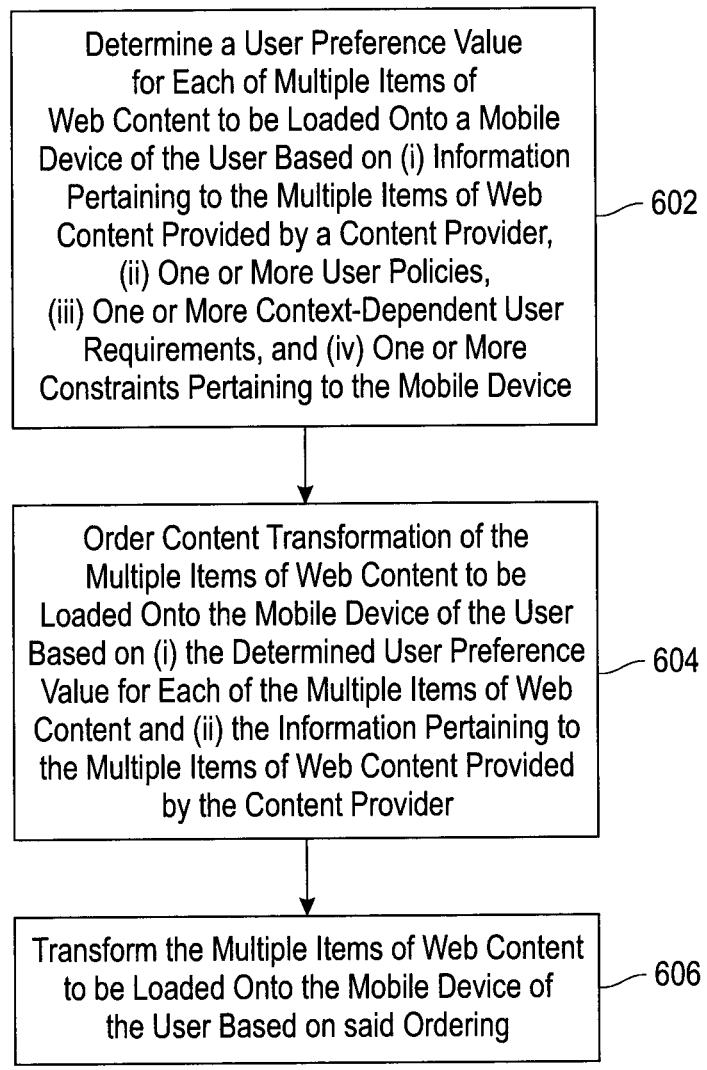
FIG. 6 is a flow diagram illustrating techniques according to an embodiment of the invention.

FIG. 6 is a flow diagram illustrating techniques according to an embodiment of the invention. Step 602 includes determining a user preference value for each of multiple items of web content to be loaded onto a mobile device of the user based on (i) information pertaining to the multiple items of web content provided by a content provider, (ii) one or more user policies, (iii) one or more context-dependent user requirements, and (iv) one or more constraints pertaining to the mobile device.

Determining a user preference value can include using a manifest file which identifies information describing the multiple items of web content and one or more elements thereof. Information describing elements of the web content can include, for example, one or more element identifiers, element type, element size, bit-rate information, and/or a central processing unit resource requirement. Additionally, such information can also include information describing, for each of the one or more elements, popularity and/or relevance, wherein said popularity and/or relevance is based on past history of access. Additionally, in at least one embodiment of the invention, the manifest file can be extracted a priori or in real-time.

Further, at least one embodiment of the invention can include determining a web browsing plan based on (i) input from the manifest file, (ii) the one or more user policies, and (iii) the one or more constraints pertaining to the mobile device. Such an embodiment can also include, for example, requesting one or more elements of the multiple items of web content based on the web browsing plan.

Step 604 includes ordering content transformation of the multiple items of web content to be loaded onto the mobile device of the user based on (i) the determined user preference values for the multiple items of web content and (ii) the information pertaining to the multiple items of web content provided by the content provider. Information pertaining to the multiple items of web content provided by a content provider can include one or more items of information pertaining to content provider preference regarding one or more elements within the multiple items of web content.

Step 606 includes transforming the multiple items of web content to be loaded onto the mobile device of the user based on said ordering.

The techniques depicted in FIG. 5 and FIG. 6 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an aspect of the invention, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 5 and FIG. 6 can be implemented via a computer program product that can include computer useable program code that is stored in a computer readable storage medium in a data processing system, and wherein the computer useable program code was downloaded over a network from a remote data processing system. Also, in an aspect of the invention, the computer program product can include computer useable program code that is stored in a computer readable storage medium in a server data processing system, and wherein the computer useable program code is downloaded over a network to a remote data processing system for use in a computer readable storage medium with the remote system.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in a computer readable medium having computer readable program code embodied thereon.

An aspect of the invention or elements thereof can be implemented in the form of an apparatus including a memory and at least one processor that is coupled to the memory and configured to perform exemplary method steps.

Figure 7:
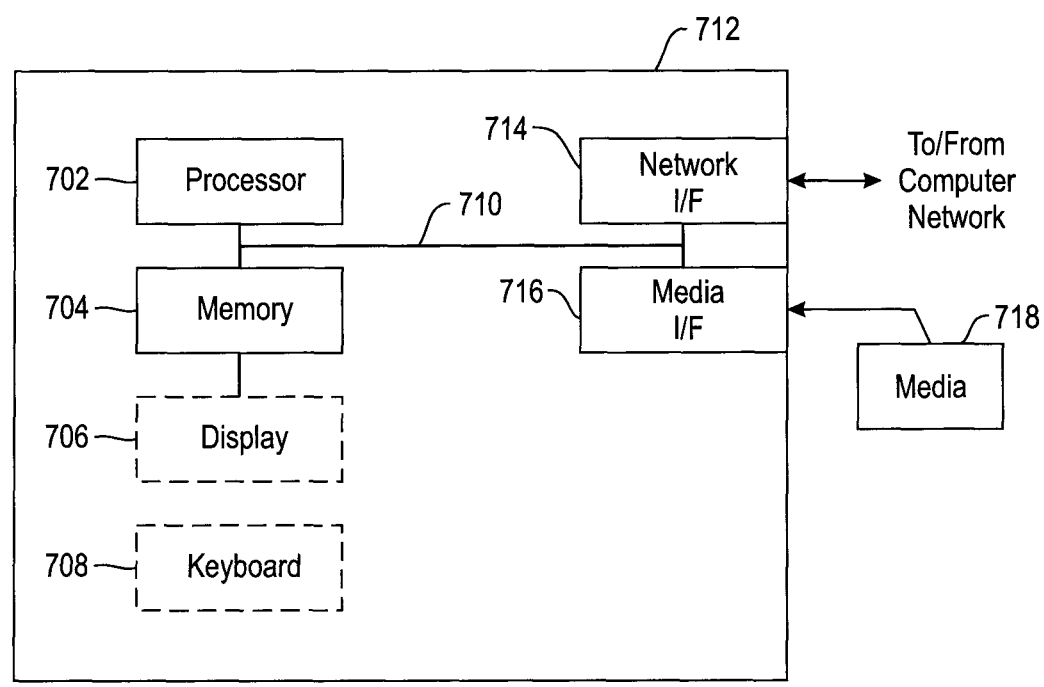
FIG. 7 is a system diagram of an exemplary computer system on which at least one embodiment of the invention can be implemented.

Additionally, an aspect of the present invention can make use of software running on a general purpose computer or workstation. With reference to FIG. 7, such an implementation might employ, for example, a processor 702, a memory 704, and an input/output interface formed, for example, by a display 706 and a keyboard 708. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 702, memory 704, and input/output interface such as display 706 and keyboard 708 can be interconnected, for example, via bus 710 as part of a data processing unit 712. Suitable interconnections, for example via bus 710, can also be provided to a network interface 714, such as a network card, which can be provided to interface with a computer network, and to a media interface 716, such as a diskette or CD-ROM drive, which can be provided to interface with media 718.

Accordingly, computer software including instructions or code for performing the methodologies of the invention, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 702 coupled directly or indirectly to memory elements 704 through a system bus 710. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 708, displays 706, pointing devices, and the like) can be coupled to the system either directly (such as via bus 710) or through intervening I/O controllers (omitted for clarity).

Network adapters such as network interface 714 may also be coupled to the system to enable the data processing system to become coupled to other data processing systems or remote printers or storage devices through intervening private or public networks. Modems, cable modems and Ethernet cards are just a few of the currently available types of network adapters.

As used herein, including the claims, a "server" includes a physical data processing system (for example, system 712 as shown in FIG. 7) running a server program. It will be understood that such a physical server may or may not include a display and keyboard.

As noted, aspects of the present invention may take the form of a computer program product embodied in a computer readable medium having computer readable program code embodied thereon. Also, any combination of computer readable media may be utilized. The computer readable medium may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM), flash memory, an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using an appropriate medium, including but not limited to wireless, wireline, optical fiber cable, radio frequency (RF), etc., or any suitable combination of the foregoing.

Computer program code for carrying out operations for aspects of the present invention may be written in any combination of at least one programming language, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. Accordingly, an aspect of the invention includes an article of manufacture tangibly embodying computer readable instructions which, when implemented, cause a computer to carry out a plurality of method steps as described herein.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, component, segment, or portion of code, which comprises at least one executable instruction for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 702. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed general purpose digital computer with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of another feature, integer, step, operation, element, component, and/or group thereof.

The corresponding structures, materials, acts, and equivalents of all means or step plus function elements in the claims below are intended to include any structure, material, or act for performing the function in combination with other claimed elements as specifically claimed.

At least one aspect of the present invention may provide a beneficial effect such as, for example, incorporating the content creator and the user in a web content adaptation process.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:

determining, dynamically by a server in connection with a user request to access a web page, a user preference value for each of multiple items of web content associated with the web page to be loaded onto a mobile device of the user, wherein said multiple items of web content comprise at least (i) one or more items of text content, (ii) one or more items of image content, and (iii) one or more items of multimedia content;

determining, dynamically by the server in connection with said user request to access said web page, a content provider preference value for each of the multiple items of web content to be loaded onto at least the mobile device of the user;

for each of the multiple items of web content to be loaded onto the mobile device of the user, combining, dynamically by the server in connection with said user request to access said web page, (i) the corresponding user preference and (ii) the corresponding content provider preference value, thereby generating a combined value for each of the multiple items of web content; and loading, dynamically by the server in connection with said user request to access said web page, the multiple items of web content to the mobile device of the user in an order of highest combined value to lowest combined value.

2. The method of claim 1, wherein said loading comprises loading the multiple items of web content as-is.

3. The method of claim 1, wherein said loading comprises loading the multiple items of web content, wherein each of the multiple items of web content comprises a transformed version of web content.

4. The method of claim 1, wherein said determining a user preference value comprises collecting a user preference value at a content-type level.

5. The method of claim 1, wherein said determining a content provider preference value comprises determining developer intent in content adaptation.

6. The method of claim 1, wherein said combining comprises executing a heuristic that weights each content provider preference value more highly than its corresponding user preference value.

7. The method of claim 1, wherein said combining comprises executing a heuristic that weights each user preference value more highly than its corresponding content provider preference value.

8. The method of claim 1, wherein said combining comprises executing a heuristic that weights each user preference value and its corresponding content provider preference value equally.

9. The method of claim 1, comprising:
filtering an item of web content if the item does not satisfy one or more resource constraints.

10. The method of claim 1, comprising:
transforming an item of web content to satisfy one or more resource constraints.

11. The method of claim 1, wherein said loading comprises loading the multiple items of web content to the mobile device of the user in order of highest combined value to lowest combined value under multiple resource constraints.

12. An article of manufacture comprising a non-transitory computer readable storage medium having computer readable instructions tangibly embodied thereon which, when implemented, cause a computer to carry out a plurality of method steps comprising:
determining, dynamically in connection with a user request to access a web page, a user preference value for each of multiple items of web content associated with the web page to be loaded onto a mobile device of the user, wherein said multiple items of web content comprise at least (i) one or more items of text content, (ii) one or more items of image content, and (iii) one or more items of multimedia content;
determining, dynamically in connection with said user request to access said web page, a content provider preference value for each of the multiple items of web content to be loaded onto at least the mobile device of the user;
for each of the multiple items of web content to be loaded onto the mobile device of the user, combining, dynamically in connection with said user request to access said web page, (i) the corresponding user preference and (ii) the corresponding content provider preference value, thereby generating a combined value for each of the multiple items of web content; and
loading, dynamically in connection with said user request to access said web page, the multiple items of web content to the mobile device of the user in an order of highest combined value to lowest combined value.

13. A system comprising:
a memory; and
at least one processor coupled to the memory and configured for:
determining, dynamically in connection with a user request to access a web page, a user preference value for each of multiple items of web content associated with the web page to be loaded onto a mobile device of the user, wherein said multiple items of web content comprise at least (i) one or more items of text content, (ii) one or more items of image content, and (iii) one or more items of multimedia content;
determining, dynamically in connection with said user request to access said web page, a content provider preference value for each of the multiple items of web content to be loaded onto at least the mobile device of the user;
for each of the multiple items of web content to be loaded onto the mobile device of the user, combining, dynamically in connection with said user request to access said web page, (i) the corresponding user preference and (ii) the corresponding content provider preference value, thereby generating a combined value for each of the multiple items of web content; and
loading, dynamically in connection with said user request to access said web page, the multiple items of web content to the mobile device of the user in an order of highest combined value to lowest combined value.

14. A method comprising:
determining, dynamically by a server in connection with a user request to access a web page, a user preference value for each of multiple items of web content associated with the web page to be loaded onto a mobile device of the user based on (i) information pertaining to the multiple items of web content provided by a content provider, (ii) one or more user policies, (iii) one or more context-dependent user requirements, and (iv) one or more constraints pertaining to the mobile device, wherein said multiple items of web content comprise at least (i) one or more items of text content, (ii) one or more items of image content, and (iii) one or more items of multimedia content;
ordering, dynamically by the server in connection with said user request to access said web page, content transformation of the multiple items of web content to be loaded onto the mobile device of the user based on (i) the determined user preference values for the multiple items of web content and (ii) the information pertaining to the multiple items of web content provided by the content provider; and
transforming, dynamically by the server in connection with said user request to access said web page, the multiple items of web content to be loaded onto the mobile device of the user based on said ordering.

15. The method of claim 14, wherein said determining comprises using a manifest file which identifies information describing the multiple items of web content and one or more elements thereof.

16. The method of claim 15, wherein said information describing said one or more elements comprises one or more element identifiers, element type, element size, bit-rate information, and/or a central processing unit resource requirement.

17. The method of claim 15, wherein said information describing said one or more elements comprises information describing, for each of the one or more elements, popularity and/or relevance, wherein said popularity and/or relevance is based on past history of access.

18. The method of claim 15, wherein said using a manifest file comprises extracting the manifest file a priori and/or in real time.

19. The method of claim 15, comprising:
   determining a web browsing plan based on (i) input from the manifest file, (ii) the one or more user policies, and (iii) the one or more constraints pertaining to the mobile device; and
   requesting one or more elements of the multiple items of web content based on the web browsing plan.

20. The method of claim 14, wherein the information pertaining to the multiple items of web content provided by the content provider comprises one or more items of information pertaining to content provider preference regarding one or more elements within the multiple items of web content.

\* \* \* \* \*